(12) United States Patent
Poortinga et al.

(10) Patent No.: US 8,689,459 B2
(45) Date of Patent: Apr. 8, 2014

(54) METHOD AND APPARATUS FOR SPRAY DRYING AND POWDER PRODUCED USING SAID METHOD

(75) Inventors: Albert Thijs Poortinga, Apeldoorn (NL); René Jos Houben, Nederweert (NL)

(73) Assignee: Friesland Brands B.V., Meppel (NL)

(*) Notice: Subject to any disclaimer, the term of this patent is extended or adjusted under 35 U.S.C. 154(b) by 703 days.

(21) Appl. No.: 12/518,139

(22) PCT Filed: Dec. 7, 2006

(86) PCT No.: PCT/NL2006/000622
§ 371 (c)(1),
(2), (4) Date: Oct. 27, 2010

(87) PCT Pub. No.: WO2008/069639
PCT Pub. Date: Jun. 12, 2008

(65) Prior Publication Data
US 2011/0052786 A1    Mar. 3, 2011

(51) Int. Cl.
*F26B 21/06* (2006.01)

(52) U.S. Cl.
USPC .......... 34/284; 34/286; 34/287; 34/381; 424/484; 424/489; 514/44 A; 426/98; 239/596

(58) Field of Classification Search
USPC .......... 34/284, 286, 287, 381, 413, 497; 424/484, 489, 490; 514/44 A, 44 R; 426/98, 601; 239/1, 3, 8, 13, 418, 496
See application file for complete search history.

(56) References Cited

U.S. PATENT DOCUMENTS

| | | | | |
|---|---|---|---|---|
| 3,309,777 A * | 3/1967 | Hutton | | 34/287 |
| 3,616,542 A * | 11/1971 | Rader | | 34/287 |
| 3,888,017 A * | 6/1975 | McBride | | 34/284 |
| 3,932,943 A * | 1/1976 | Briggs et al. | | 34/287 |
| 5,727,333 A * | 3/1998 | Folan | | 34/285 |
| 6,148,536 A * | 11/2000 | Iijima | | 34/92 |
| 6,221,435 B1 * | 4/2001 | Nielsen | | 427/421.1 |
| 6,223,455 B1 * | 5/2001 | Chickering et al. | | 34/578 |
| 6,503,362 B1 * | 1/2003 | Bartels et al. | | 156/345.17 |
| 6,802,137 B1 * | 10/2004 | Gray | | 34/340 |
| 7,007,406 B2 * | 3/2006 | Wang et al. | | 34/286 |

(Continued)

FOREIGN PATENT DOCUMENTS

| | | |
|---|---|---|
| EP | 0 235 603 A2 | 9/1987 |
| EP | 0 268 866 A2 | 6/1988 |

(Continued)

OTHER PUBLICATIONS

Patent examiner ProKon conversion program for presure conversion from bar to psi (May 2013).*

Primary Examiner — Steve M Gravini
(74) Attorney, Agent, or Firm — Jennifer E. Lacroix; DLA Piper LLP US (57) ABSTRACT

Method for spray drying a high-viscosity fluid product using a spraying device, wherein the method comprises projecting the fluid product out of an outflow opening of the spraying device for obtaining droplets of the fluid product, wherein the spraying device is arranged to cause a pressure drop in the fluid product across the outflow opening which is larger than 15 bar and at least partially drying the droplets in a drying medium, such as air, to become particles.

34 Claims, 3 Drawing Sheets

(56) References Cited

U.S. PATENT DOCUMENTS

| | | | |
|---|---|---|---|
| 7,363,726 B2 * | 4/2008 | Wang et al. | 34/286 |
| 7,836,606 B2 * | 11/2010 | Gehrmann et al. | 34/284 |
| 8,322,046 B2 * | 12/2012 | Wang et al. | 34/286 |
| 2008/0243049 A1 * | 10/2008 | Hardy | 604/22 |
| 2011/0052786 A1 * | 3/2011 | Poortinga et al. | 426/658 |
| 2012/0090192 A1 * | 4/2012 | Oevreboe et al. | 34/285 |
| 2013/0042893 A1 * | 2/2013 | Ariessohn et al. | 134/22.11 |

FOREIGN PATENT DOCUMENTS

| | | | | |
|---|---|---|---|---|
| EP | 574173 A1 * | 12/1993 | | B01J 2/16 |
| EP | 1 344 562 A2 | 9/2003 | | |
| EP | 1 372 042 A2 | 12/2003 | | |
| JP | 59109219 A * | 6/1984 | | B01D 46/42 |
| JP | 2000327562 A * | 11/2000 | | A61K 9/16 |
| WO | WO 03024602 A1 * | 3/2003 | | B02C 19/06 |

* cited by examiner

METHOD AND APPARATUS FOR SPRAY DRYING AND POWDER PRODUCED USING SAID METHOD

The invention relates to a method for spray drying a fluid product using a spraying device, wherein the method comprises projecting the fluid product out of an outflow opening of the spraying device for obtaining droplets of the fluid product and at least partially drying the droplets in a drying medium, such as air, to become particles.

Methods for spray drying a fluid product are known per se. In one type of spray drying method, the fluid product is fed to a nozzle, which produces a mist of droplets of the fluid product in a vessel. The droplets are subsequently dried, e.g. in a stream of air.

Another method for spray drying a fluid product is known from WO 2005/058473. This known method comprises projecting, by means of nozzles, jets of liquid and disturbing the jets to cause break up thereof into streams of droplets. Further, the droplets are contacted with streams of gas to cause or allow the droplets to, at least partially, solidify.

The known (conventional) spray drying methods, however, have the disadvantage that a relatively large amount of energy is required for drying the droplets to become particles.

It is an object of the present invention to at least partially obviate the above problem.

According to a first aspect of the invention, the amount of energy required for drying the droplets to become particles can be reduced by spray drying high-viscosity fluid products.

A fluid product to be spray dried usually comprises a solvent, e.g. a liquid such as water, and dry matter dissolved and/or suspended in the solvent. In the fluid product to be spray dried, the viscosity is inter alia related to the concentration of the dry matter in the solvent. When the viscosity of the fluid product is high (i.e. higher than viscosities conventionally used for fluid products to be spray dried), the concentration of dry matter is larger than the concentration of dry matter in fluid products which are spray dried using known spray drying methods. Hence, according to the first aspect of the invention, the droplets of the high-viscosity fluid product comprise less solvent than droplets of fluid products in conventional spray drying methods, so that less energy is required to remove the solvent from the droplets to dry the droplets to become dry particles.

Conventional spray drying methods, and spray drying equipment, are not suitable for spray drying high-viscosity fluid products. The high-viscosity fluid product prevents natural formation of droplets. Further, in methods using projecting jets of liquid and disturbing the jets to cause break up thereof into streams of droplets, use of a high-viscosity fluid product prevents the formation of jets and/or the controlled break-up of the jets into droplets.

Further, generally, the skilled person will not consider high-viscosity fluid products as starting material for spray-drying. In this light, reference is made to the review of Prof. Walzel in Chem.-Ing.-Tech. 62 (1990) Nr. 12, pages 983-994, who observes that the commonly used "Hohlkegeldüsen sind für höhere Flüssigkeitsviskositäten ungeeignet". For a 1 mm nozzle, a viscosity of 50 mPa·s is said to be the maximum viscosity.

In order to overcome this problem, according to a second aspect of the invention the spraying device is arranged to cause a pressure drop in the fluid product across the outflow opening which is larger than 15 bar. Preferably, the pressure drop is larger than 50 bar, more preferably larger than 100 bar, most preferably larger than 300 bar.

Hence it is possible to spray dry a high-viscosity fluid product using a spraying device, wherein the method comprises projecting the fluid product out of an outflow opening of the spraying device for obtaining droplets of the fluid product and at least partially drying the droplets in a drying medium, such as air, to become particles.

Here a fluid product to be spray dried is considered a high-viscosity fluid product if the viscosity, determined at a spray drying temperature which in use prevails in the outflow opening, e.g. −50 to 300° C., preferably 40-100° C., and a shear rate as in use present in the outflow opening, e.g. $1 \cdot 10^4$-$1 \cdot 10^6$ s$^{-1}$, using a capillary viscosity meter, is higher than 10 mPa·s, preferably higher than 25 mPa·s, more preferably higher than 50 mPa·s, even more preferably higher than 100 mPa·s and most preferably higher than 200 mPa·s. Since products to be spray dried are usually shear-thinning and since the viscosity normally decreases with increasing temperature, it has been shown that these viscosities may well correspond with viscosities above 1 Pa·s at 20° C. and zero shear.

Alternatively, or additionally, as the droplets comprise less solvent, it is also possible to dry the droplets in a shorter time. It is also possible to dry the droplets, after having been ejected by the outflow opening along a shorter flight path. Hence it is possible to dry the droplets in a smaller installation, e.g. in a smaller vessel.

According to a third aspect of the invention, the step of projecting the fluid product out of the outflow opening comprises generating a fluid jet projecting from the outflow opening, and disturbing the fluid jet for breaking the fluid jet into droplets with a narrow size distribution. Preferably, the step of disturbing the fluid jet comprises varying the pressure of the fluid product upstream of the outflow opening, e.g. by moving an end of a control element in a direction from/to the outflow opening, for instance at a predetermined distance of 2-1500 µm, preferably 15-500 µm, to the outflow opening, for varying the pressure of the fluid product by vibrating the control element. Thus, controlled break-up of the jet into droplets is possible. The larger concentration of dry matter in the droplets and the narrow size distribution further allow reduction of the amount of energy required for drying the droplets, because it is not necessary to over-dry the droplets to be sure that even the largest particles are fully dried.

Preferably, the pressure of the fluid product upstream of the outflow opening is varied at a predetermined, substantially constant, frequency. This aids in providing the narrow particle distribution. A droplet diameter may be determined by controlling the predetermined frequency.

Hence, it is possible to generate particles with a relatively narrow particle size distribution, e.g. a particle size distribution with a monodispersity index of less than 1, preferably less than 0.7, more preferably less than 0.1. The monodispersity index of the particle size distribution is defined as $(d_{90}-d_{10})/d_{50}$, wherein $d_{10}$, $d_{50}$ and $d_{90}$ represent the 10%, 50% and 90% particle size percentiles, respectively.

A narrow particle size distribution has, inter alia, the advantage that substantially all particles posses a desired property, such as good solubility. Further, it can be prevented that dust, i.e. particles that are so small that they are blown into the environment, e.g. by drying air, is produced. Hence, the yield of the spray drying process can be larger.

Preferably, the predetermined frequency is chosen such that a distance between two droplets consecutively ejected at the outflow opening is greater than or equal to two times the droplet diameter, preferably greater than or equal to three times the droplet diameter. Hence, it is effectively prevented that droplets coagulate after being formed. Thus, the narrow size distribution is better maintained.

Preferably, the predetermined frequency is chosen such that a distance between two droplets consecutively ejected at the outflow opening is smaller than or equal to eight times the droplet diameter, preferably smaller than or equal to four times the droplet diameter. Hence, droplets can be produced at a high repetition rate.

According to a fourth aspect of the invention, the step of projecting the fluid product out of the outflow opening comprises providing the fluid product to an outflow opening at a predetermined feed pressure. Preferably, the feed pressure is kept substantially constant. This provides the advantage, that a jet is formed wherein break-up into droplets is not influenced by variations in the feed pressure. Thus, the narrow size distribution is better maintained.

The feed pressure may be kept substantially constant by means of applying pressure to the fluid product hydraulically or pneumatically. Hydraulically is understood to mean: using a liquid; and pneumatically is understood to mean: using a gas. Through the ability to apply the feed pressure to the fluid product utilizing a gas and/or a liquid, the fluid product can be supplied to the outflow opening in a stable manner at a very high pressure of e.g. more than 15 bars.

Alternatively, or additionally, the feed pressure may be kept substantially constant by means of a pump.

According to a fifth aspect of the invention, the method may comprise projecting the fluid product out of a plurality of outflow openings of the spraying device for obtaining droplets of the fluid product. Hence, it is possible to increase the volume of fluid product per unit time that can be spray dried using the method.

According to a sixth aspect of the invention, the viscosity of the fluid product, determined at the spray drying temperature which in use prevails in the outflow opening, e.g. −50 to 300° C., preferably 40-100° C., and a shear rate as in use present in the outflow opening, e.g. $1\cdot10^4$-$1\cdot10^6$ $s^{-1}$, using a capillary viscosity meter, is higher than 10 mPa·s, preferably higher than 25 mPa·s, more preferably higher than 50 mPa·s, even more preferably higher than 100 mPa·s and most preferably higher than 200 mPa·s. Hence, a high-viscosity fluid product can be spray-dried.

Further, preferably a transverse dimension, e.g. a smallest transverse dimension such as a diameter, of the outflow opening is smaller than or equal to 150 μm, preferably smaller than or equal to 100 μm, more preferably smaller than or equal to 80 μm. Hence, it is possible to produce relatively small droplets, e.g. droplets with an average size smaller than or equal to 250 μm.

In a special embodiment, the viscosity of the fluid product, determined at the spray drying temperature which in use prevails in the outflow opening, e.g. 40-100° C., and a shear rate as in use present in the outflow opening, e.g. $1\cdot10^4$-$1\cdot10^6$ $s^{-1}$, using a capillary viscosity meter, is higher than 30 mPa·s, while the transverse dimension, e.g. the diameter, of the outflow opening is smaller than or equal to 100 μm.

The invention further relates to a powder produced using the method according to the invention and an apparatus for spray drying a high-viscosity fluid product Further details, aspects and embodiments of the invention will be described, by way of example only, with reference to the drawings.

FIG. 1 shows an example of a first embodiment of an apparatus for spray drying a fluid product according to the invention.

FIG. 2 shows an example of a second embodiment of an apparatus for spray drying a fluid product according to the invention.

FIG. 3 shows an example of a third embodiment of an apparatus for spray drying a fluid product according to the invention.

FIGS. 4*a*-4*g* show examples of plan views of a plurality of outflow openings of embodiments of a spraying device according to the invention.

FIG. 1 shows an example of a first embodiment of an apparatus 1 for spray drying a fluid product according to the invention. The apparatus 1 comprises a spraying device 2. In this example, the spraying device 2 is in fluid communication with a product supply line 4, for supplying the fluid product to be spray dried to the spraying device 2. The spraying device 2 is arranged for projecting the fluid product out of an outflow opening 6 of the spraying device for obtaining droplets 8 of the fluid product. In this example, the spraying device 2 projects the droplets 8 into a vessel 10. Here, the vessel 10 forms drying means for allowing the droplets 8 to dry to become particles. It is also possible that the apparatus comprises drying means for causing the droplets 8 to dry to become particles, e.g. supply means for drying air. Such supply means may e.g. provide drying air flowing along with the droplets or in a counter flow flowing opposite to the direction of the droplets.

In use, the fluid product to be spray dried is supplied to the spraying device 2. According to the invention the fluid product is a high-viscosity fluid product. The viscosity of the fluid product is higher than 10 mPa·s, preferably higher than 25 mPa·s, more preferably higher than 50 mPa·s even more preferably higher than 100 mPa·s, most preferably higher than 200 mPa·s, determined at the spray drying temperature which in use prevails in the outflow opening, e.g. −50 to 300, in this example 40-100° C., and a shear rate as in use present in the outflow opening, e.g. $1\cdot10^4$-$1\cdot10^6$ $s^{-1}$, in this example $5\cdot10^5$ $s^{-1}$, using a capillary viscosity meter.

In this Example a smallest transverse dimension, such as a diameter, of the outflow opening 6 is smaller than or equal to 150 μm, preferably smaller than or equal to 100 μm, more preferably smaller than or equal to 80 μm.

Hence, it is possible to spray dry a fluid product having a viscosity of higher than 10 mPa·s using an outflow opening 6 of smaller than or equal to 150 μm, or a fluid product having a viscosity of higher than 25 mPa·s using an outflow opening of smaller than or equal to 150 μm, or a fluid product having a viscosity of higher than 50 mPa·s using an outflow opening of smaller than or equal to 150 μm, or a fluid product having a viscosity of higher than 100 mPa·s using an outflow opening of smaller than or equal to 150 μm, or a fluid product having a viscosity of higher than 200 mPa·s using an outflow opening of smaller than or equal to 150 μm, or a fluid product having a viscosity of higher than 10 mPa·s using an outflow opening of smaller than or equal to 100 μm, or a fluid product having a viscosity of higher than 25 mPa·s using an outflow opening of smaller than or equal to 100 μm, or a fluid product having a viscosity of higher than 50 mPa·s using an outflow opening of smaller than or equal to 100 μm, or a fluid product having a viscosity of higher than 100 mPa·s using an outflow opening of smaller than or equal to 100 μm, or a fluid product having a viscosity of higher than 200 mPa·s using an outflow opening of smaller than or equal to 100 μm, or a fluid product having a viscosity of higher than 10 mPa·s using an outflow opening of smaller than or equal to 80 μm, or a fluid product having a viscosity of higher than 25 mPa·s using an outflow opening of smaller than or equal to 80 μm, or a fluid product having a viscosity of higher than 50 mPa·s using an outflow opening of smaller than or equal to 80 µm, or a fluid product having a viscosity of higher than 100 mPa·s using an outflow opening of smaller than or equal to 80 µm, or a fluid product having a viscosity of higher than 200 mPa·s using an outflow opening of smaller than or equal to 80 µm, wherein the viscosity is defined at the spray drying temperature which in use prevails in the outflow opening, e.g. −50 to 300° C., in this example 40-100° C., and a shear rate as in use present in the outflow opening, e.g. $1 \cdot 10^4$-$1 \cdot 10^6$ s$^{-1}$, in this example $5 \cdot 10^5$ s$^{-1}$, using a capillary viscosity meter.

Spray drying the high-viscosity fluid product with the above viscosity, is effected using the spraying device 2, having the above outflow opening 6, which is arranged to cause a pressure drop in the fluid product across the outflow opening 6 which is larger than 15 bar, preferably larger than 50 bar, more preferably larger than 100 bar, most preferably larger than 300 bar. The combination of the pressure drop, high viscosity and dimension of the outflow opening provide that droplets of the high-viscosity fluid product can be produced having a desired size, of e.g. smaller than or equal to 250 µm in average, while the amount of energy required to dry the droplets is reduced with respect to conventional spray drying methods.

Figure 2:
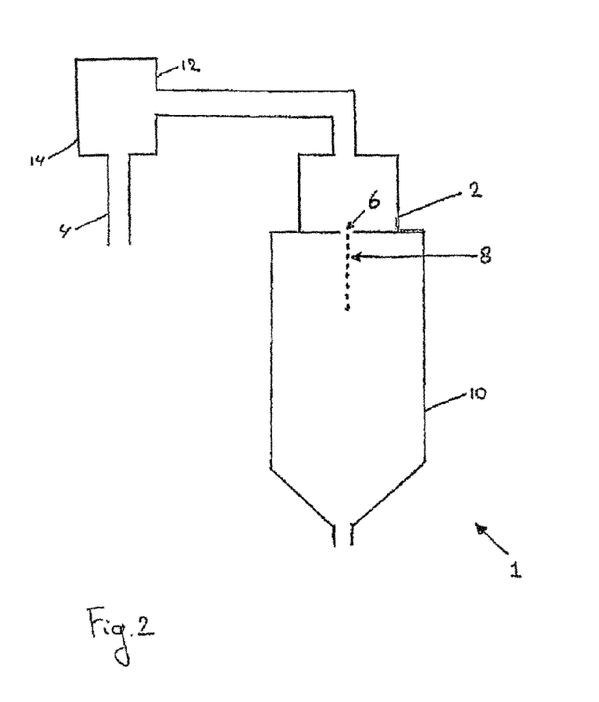

FIG. 2 shows an example of a second embodiment of an apparatus 1 for spray drying a fluid product according to the invention. In the example of FIG. 2 the spraying device 2 comprises feed pressure generating means 12 for providing the fluid product to the outflow opening 6 at a predetermined feed pressure for obtaining a fluid jet. Here, the feed pressure generating means 12 are arranged for keeping the feed pressure substantially constant. Hence, a fluid jet is generated, while the feed pressure generating means 12 substantially do not disturb the jet.

In the example of FIG. 2, the feed pressure generating means comprise a pump 14 for supplying the fluid product at the desired pressure. The pump 14 may be arranged for keeping the feed pressure substantially constant. Thereto, the pump may comprise a pressure regulator, such as for instance an overpressure valve and/or a damper.

Alternatively, or additionally, the feed pressure generating means 12 may be arranged for applying pressure to the fluid product hydraulically or pneumatically for keeping the feed pressure substantially constant, i.e. the feed pressure generating means 12 may use pressurized liquid or gas, respectively, to exert a substantially constant pressure on the fluid product.

Preferably, the feed pressure generating means 12 generate the feed pressure which is in the interval of 15-3000 bars, more preferably in the interval of 15-600 bars. Hence, it is possible to spray dry the high-viscosity fluid product.

Figure 3:
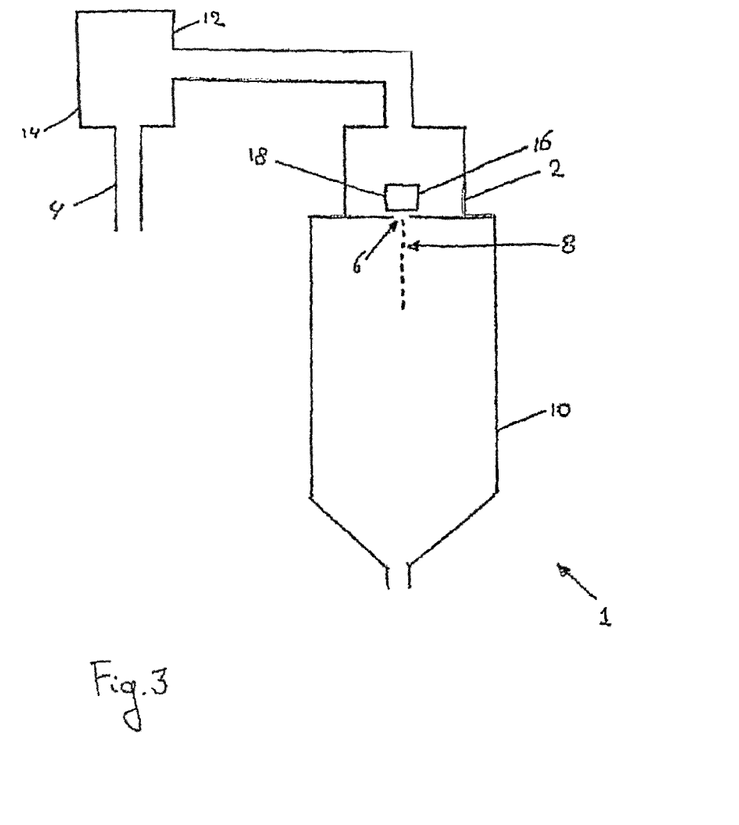

FIG. 3 shows an example of a third embodiment of an apparatus for spray drying a fluid product according to the invention.

In the example of FIG. 3 the spraying device 12 comprises pressure varying means 16 for varying the pressure of the fluid product upstream of the outflow opening 6. When the jet is projected from the outflow opening, variations in the pressure of the fluid product of the jet cause the jet to contract at points of minimum pressure. Subsequently, the fluid jet will break up at the contractions, thus forming droplets. An amplitude of the variations in the pressure of the fluid product may be approximately 10% of the feed pressure. The amplitude of the variations in the pressure may be 1 mbar to 100 bar, preferably smaller than or equal to 25 bar.

In this example, the pressure varying means 16 comprise a control element 18, which is movable in a direction from/to the outflow opening 6. Vibrating the control element 18 relative to the outflow opening 6 causes the pressure of the fluid product to vary between the control element 18 and the outflow opening 6. When the fluid product is projected from the outflow opening 6 in the fluid jet, the variations in pressure in the fluid product extend into the jet.

The pressure varying means 16 may e.g. comprise a piezoelectric element, an electrostrictive element, an acoustic element, an electromagnetic actuator, a voice-coil, and/or mechanical means for moving the control element 18 in the direction from/to the outflow opening 6.

In a preferred embodiment, the control element 18 is positioned at a predetermined distance of 2-1500 µm, preferably 15-500 µm, to the outflow opening 6. This provides the advantage that a pressure variation exerted to the high-viscosity fluid product is prevented from being damped by the high-viscosity fluid product to an extent that the jet projected from the outflow opening does not experience a pressure variation with large enough amplitude to effectively break up into droplets.

In a particularly effective embodiment, the pressure varying means 16 are arranged for varying the pressure of the fluid product upstream of the outflow opening 6 at a predetermined frequency. Preferably, the predetermined frequency is substantially constant. Hence, the fluid jet will contract, and subsequently break up, at substantially equidistant positions along the fluid jet. Thus, substantially equal sized droplets will be formed, providing droplets with a relatively narrow droplet size distribution, e.g. a droplet size distribution with a monodispersity index of less than 1, preferably smaller than 0.7, more preferably smaller than 0.1. The monodispersity index of the droplet size distribution is defined as $(d_{90}-d_{10})/d_{50}$, wherein $d_{10}$, $d_{50}$ and $d_{90}$ represent the 10%, 50% and 90% droplet size percentiles, respectively.

In this example, the predetermined frequency is chosen such that a distance between two droplets consecutively ejected at the outflow opening 6 is greater than or equal to two times the droplet diameter, preferably greater than or equal to three times the droplet diameter. Thus, coagulation of droplets can be prevented, maintaining a narrow droplet size distribution.

In this example the predetermined frequency is in the interval of 500-200000 Hz. For example, when using a fluid product having a viscosity of 50 mPa·s and using an outflow opening having a transverse dimension, e.g. a smallest transverse dimension such as a diameter, of 80 µm, the frequency may be chosen between 500 and 40000 Hz for obtaining droplets with an average size ($d_{50}$) of 133 µm to 575 µm depending on chosen frequency and volume flow of fluid product through the outflow opening.

Figure 1:
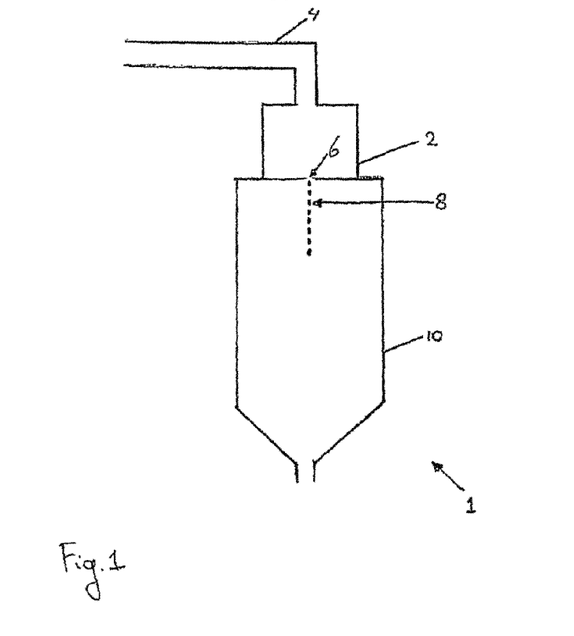

In the examples of FIGS. 1-3 the spraying device 2 comprises one outflow opening 6. It will be appreciated that it is also possible that the spraying device 2 comprises a plurality of outflow openings 6 for projecting the fluid product out of the plurality of outflow openings for obtaining droplets of the fluid product. Thereto, the outflow openings may e.g. may be arranged as bores in a surface of the spraying device. The plurality of outflow openings may be arranged for generating a plurality of mutually divergent jets of the fluid product. Thereto, the outflow openings may e.g. may be arranged as bores in a surface of the spraying device, which bores extend in mutually diverging directions, e.g. in directions which are non-perpendicular with respect to the surface of the spraying device 2. When the jets are mutually divergent, the risk of coagulation of droplets ejected by mutually different outflow openings is reduced, since a distance between the droplets ejected by the mutually different outflow openings increases during flight. It is possible to use the plurality of outflow openings in combination with a single control element for varying the pressure of substantially all fluid jets generated by the plurality of outflow openings.

Preferably, the outflow openings of the plurality of outflow openings have substantially identical dimensions, to allow droplets of substantially identical dimensions to be ejected from each separate outflow opening, hence allowing the droplets to be produced with the relatively narrow size distribution.

Preferably, a distance between two adjacent outflow openings of the plurality of outflow openings is larger than 1.5 times a transverse dimension, such as a diameter, of at least one of the two adjacent outflow openings, more preferably larger than 2 times, most preferably larger than or equal to 2.5 times the transverse dimension. Hence, the risk of coagulation of droplets ejected by mutually different outflow openings is reduced. Preferably, a distance between two adjacent outflow openings of the plurality of outflow openings is smaller than 5 times a transverse dimension, such as a diameter, of at least one of the two adjacent outflow openings, more preferably smaller than 4 times, most preferably smaller than or equal to 3 times the transverse dimension. Hence, a physical size of the spraying device 2 may be limited.

Figure 4A:
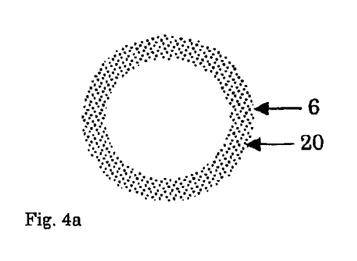
Figure 4B:
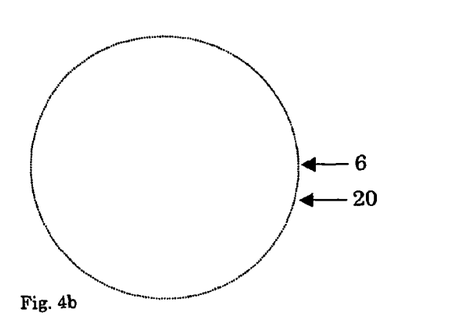
Figure 4C:
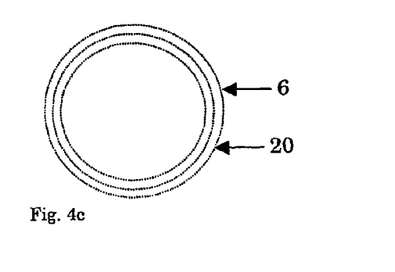
Figure 4D:
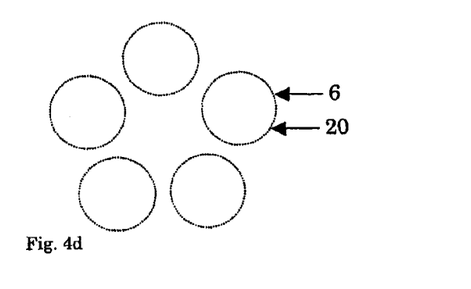

FIGS. 4a-4g show examples of plan views of the plurality of outflow openings 6 of embodiments of the spraying device 2 according to the invention. In the examples of FIGS. 4a-4d, the plurality of outflow openings 6 is arranged in a substantially ring-shaped formation 20. In FIG. 4a an example is shown of a ring of closely packed outflow openings, e.g. in hexagonal close packing. Hence, a hollow cone of droplets may be generated. In FIG. 4b an example is shown of a ring comprising a single endless line of outflow openings. The single line of outflow openings reduces the risk of coagulation of droplets. In FIG. 4c an example is shown wherein the plurality of outflow openings is arranged in a formation comprising a plurality of substantially ring-shaped sub-formations, here three spaced concentric rings each comprising a single endless line of outflow openings. The spaced single line rings reduce the risk of coagulation of droplets, while reducing the surface area size required for providing a predetermined number of outflow openings, with respect to the example of FIG. 4b. In FIG. 4d an example is shown wherein the plurality of outflow openings is arranged in a formation comprising a plurality of substantially ring-shaped sub-formations, here five non-concentric rings each comprising a single endless line of outflow openings.

Figure 4E:
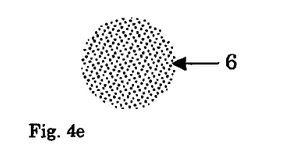

FIG. 4e shows an example of a circle of closely packed outflow openings, e.g. in hexagonal close packing. Hence, a full cone of droplets may be produced, giving a large number of droplets per unit surface area of spraying device comprising outflow openings. Hence, a compact spray drying apparatus may be provided.

Figure 4F:
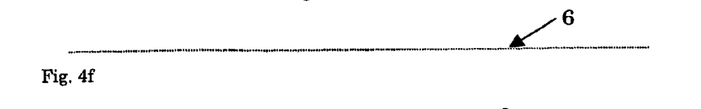
Figure 4G:
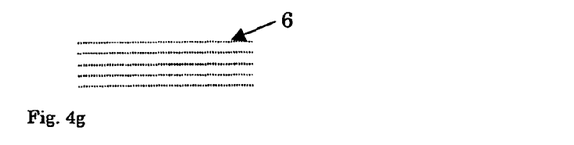

FIG. 4f shows an example of a substantially straight line of outflow openings. This e.g. allows for spray drying into a narrow wide vessel. FIG. 4g shows an example of a plurality of spaced substantially straight lines of outflow openings.

According to the invention a method for spray drying a high-viscosity fluid product is provided. This method can e.g. be performed using the spraying device 2 according to any one of the Figures. The method comprises projecting the fluid product out of the outflow opening 6 of the spraying device 2 for obtaining droplets of the fluid product, wherein the spraying device 2 is arranged to cause a pressure drop in the fluid product across the outflow opening 6 which is larger than 15 bar, and at least partially drying the droplets in a drying medium, such as air, to become particles.

As already explained with respect to the apparatus 1, the pressure drop is preferably larger than 50 bar, more preferably larger than 100 bar, most preferably larger than 300 bar.

Using the method according to the invention, a powder may be produced. The powder may have a monodispersity index smaller than 1, preferably smaller than 0.7, more preferably smaller than 0.1. The monodispersity index of the powder is defined as $(d_{90}-d_{10})/d_{50}$, wherein $d_{10}$, $d_{50}$ and $d_{90}$ represent the 10%, 50% and 90% particle size percentiles of the powder, respectively. The powder may have an average particle diameter smaller than or equal to 250 μm.

According to the invention, the powder is produced from the high-viscosity fluid product by spray drying. As already mentioned this has the advantage, that the fluid product to be spray dried may comprise relatively large concentrations of dry matter, so that relatively small amounts of solvent have to be removed from droplets expelled by the outflow opening to yield dry particles. Without wishing to be bound by any theory, it is believed that this causes less inclusion of solvent within a dry outer crust of the particle, so that after drying particles are obtained with lower porosity and/or a lower percentage of included gas. Hence, using the method according to the invention, it is possible to produce the powder having small percentage of the volume of the particles consisting of gas and/or voids, e.g. less than 5% of a volume of particles of the powder consists of gas and/or voids. Further, using the method according to the invention, it is possible to produce the powder having a high density, e.g. having a bulk density larger than or equal to 550 kg/m$^3$ or preferably larger than or equal to 650 kg/m$^3$ for food powders, generally mainly comprising fat, protein and/or carbohydrates.

For food powders comprising fat a bulk density may be obtained which is higher than a reference bulk density according to the equation $$RBD = ZFD - 5 \times FC$$

wherein RBD represents the reference bulk density in kg/m$^3$, ZFD represents a zero-fat-density which represents the bulk density (in kg/m$^3$) of a powder containing no fat, and FC represents the fat content in percents by weight of the dried product. Using the spray drying method according to the invention, a powder may be obtained having bulk density (in kg/m$^3$) which is higher than the RBD according to the above equation wherein ZFD is equal to or larger than 650 kg/m$^3$, preferably equal to or larger than 800 kg/m$^3$.

Exemplary powders were produced using the spray drying method according to the invention. A first powder had a fat content of 50% by weight and a bulk density of 540 kg/m$^3$. A second powder had a fat content of 78 percent by weight and a bulk density of 420 kg/m$^3$.

EXAMPLE 1

The production of highly monodisperse maltodextrin powder was conducted according to the following procedure:

A solution of 60% by weight maltodextrin and 40% by weight of water was prepared, having a density of 1250 mg/ml. This solution was fed into a high viscosity spraying device as described hereinabove. The spraying device used has a substantially circular outflow opening with a diameter of 50 micrometers. The solution was projected out of the outflow opening with a feed rate of 1.25 ml/min, and a firing frequency of 23.7 kHz (i.e. droplets were produced at a rate of $23.7 \cdot 10^3$ droplets per second). The temperature of the spraying device at the outflow opening was 80° C. and the feed pressure applied in the spraying device was 35 bar. The resulting droplets had an average diameter of 120 μm.

To dry these droplets to obtain a monodisperse powder, the droplets were ejected into a spray drying tower with an entrance temperature of 170° C. and exit temperature of 85° C. The running length for drying was 1.8 meter and the venting percentage was 60%, which resulted in an average residence time of 2-6 s for each droplet. The particles of the resulting powder produced had an average diameter of 95 μm and a monodispersity index of 0.60. The powder produced had a bulk density of 840 kg/m$^3$.

EXAMPLE 2

Monodisperse creamer-powder was produced according to the following procedure.

A solution of 30% by weight water, 3% by weight Sodium Caseinate, and 38% by weight maltodextrin was prepared, into which 29% by weight sunflower oil was emulsified using a high pressure homogeniser. The emulsion had a viscosity of 30-40 mPa·s at 85° C. and high shear ($5 \cdot 10^5$ s$^{-1}$) and a viscosity of 700-900 mPa·s at low shear (300 s$^{-1}$) and 20° C., both measured with a capillary viscosity meter.

This solution was fed into a high viscosity spraying device as described hereinabove, having a substantially circular outflow opening with a diameter of 50 micrometers. The solution was projected out of the outflow opening with a feed rate of 1 ml/min, and a firing frequency of 25 kHz. The temperature of the spraying device at the outflow opening was 73° C. and the feed pressure applied in the spraying device was 60 bar. To dry the droplets produced to obtain monodisperse powder, the droplets were ejected into a spray drying tower with an entrance temperature of 129° C. and exit temperature of 85° C. The running length for drying was 1.8 meter and the venting percentage was 60%, which resulted in an average residence time of 2-6 s for each droplet. The resulting powder produced had an average particle diameter of 147 μm and a monodispersity index of 0.69. The powder produced had a bulk density of 550 kg/m$^3$.

The method and apparatus according to the invention may be used for spray drying products such as a nutrient or an ingredient therefore, e.g. dairy products, proteins, carbon hydrates, fats, or combinations thereof. Alternative products are, however, not excluded.

In the foregoing specification, the invention has been described with reference to specific examples of embodiments of the invention. It will, however, be evident that various modifications and changes may be made therein without departing from the broader spirit and scope of the invention as set forth in the appended claims. For example, instead of for spray drying nutrients or ingredients therefore, the method may also be used for spray drying other products such as, but not limited to, detergents, pigments, catalysts, pharmaceuticals, cosmetics, polymeric resins, ceramic powders, powder coating materials, adhesives, gypsum, cement, metal powders, etc.

However, other modifications, variations and alternatives are also possible. The specifications, drawings and examples are, accordingly, to be regarded in an illustrative rather than in a restrictive sense.

In the claims, any reference signs placed between parentheses shall not be construed as limiting the claim. The word 'comprising' does not exclude the presence of other features or steps then those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to advantage.

What is claimed is:

1. A method for spray drying a high-viscosity fluid product using a spraying device, comprising the steps of:
generating a fluid jet of the fluid product projecting from an outflow opening of the spraying device and breaking the fluid jet into droplets of the fluid product by disturbing the fluid jet, wherein the step of disturbing the fluid jet comprises varying a pressure of the fluid product upstream of the outflow opening by vibrating an end of a control element, positioned in the fluid product upstream of the outflow opening at a predetermined distance to the outflow opening;
wherein the spraying device is arranged to cause a pressure drop in the fluid product across the outflow opening which is larger than 15 bar; and
at least partially drying the droplets in a drying medium, to become particles.

2. The method according to claim 1, wherein the pressure drop is larger than 100 bar.

3. The method according to claim 1, wherein the pressure drop is in the interval of 15-3000 bar.

4. The method according to claim 1, wherein the step of generating the fluid jet of the fluid product comprises:
providing the fluid product to an outflow opening at a predetermined feed pressure.

5. The method according to claim 1, wherein the predetermined distance is 2-1500 μm.

6. The method according to claim 1, wherein the control element is vibrated using at least one of a piezo-electric element, an electrostrictive element, an acoustic element, an electromagnetic actuator, a voice-coil, or mechanical means.

7. The method according to claim 1, wherein the pressure of the fluid product upstream of the outflow opening is varied at a predetermined, substantially constant, frequency.

8. The method according to claim 7, wherein a droplet diameter is determined by controlling the predetermined frequency and/or material throughput through the outflow opening.

9. The method according to claim 7, wherein the predetermined frequency is chosen such that a distance between two droplets consecutively ejected at the outflow opening is greater than or equal to two times the droplet diameter.

10. The method according to claim 7, wherein the predetermined frequency is in the interval of 500-200000 Hz.

11. The method according to claim 1 further comprising a step of
projecting the fluid product out of a plurality of outflow openings of the spraying device for obtaining droplets of the fluid product.

12. The method according to claim 1, wherein a viscosity of the fluid product, determined at a spray drying temperature which in use prevails in the outflow opening and a shear rate as in use present in the outflow opening, is higher than 200 mPa·s.

13. The method according to claim 1, wherein a transverse dimension of the outflow opening is smaller than or equal to 150 μm.

14. The method according to claim 4, wherein the feed pressure is kept substantially constant.

15. The method according to claim 14, wherein the feed pressure is kept substantially constant by means of applying a pressure to the fluid product hydraulically or pneumatically.

16. The method according to claim 14, wherein the feed pressure is kept substantially constant by means of a pump.

17. The method according to claim 1, wherein the feed pressure is in the interval of 15-3000 bars.

18. A powder produced using the method according to claim 1.

19. The powder according to claim 18 having a monodispersity index smaller than 1.

20. The powder according to claim 18, having an average particle diameter (d50) smaller than or equal to 250 μm.

21. The powder according to claim 18, wherein less than 5% of the volume of the powder particles consists of gas and/or voids.

22. The powder according to claim 18, comprising a food product mainly comprising protein, carbohydrate, fat, or a combination thereof.

23. The powder according to claim 18 having a bulk density larger than or equal to 550 kg/m3.

24. A powder produced using a spraying device by:
projecting a fluid product out of an outflow opening of the spraying device for obtaining droplets of the fluid product, wherein the spraying device is arranged to cause a pressure drop in the fluid product across the outflow opening which is larger than 15 bar; and
at least partially drying the droplets in a drying medium, such as air, to become particles of the powder;
the powder comprising fat, having a bulk density higher than a reference bulk density according to the equation $$RBD=ZFD-5\times FC$$

wherein RBD represents the reference bulk density in kg/m3, ZFD represents a zero-fat-density which represents the bulk density (in kg/m3) of a powder containing no fat, and FC represents the fat content of the powder in percents by weight, wherein ZFD is equal to or larger than 650 kg/m3, preferably equal to or larger than 800 kg/m3.

25. The method according to claim 2, wherein the pressure drop is larger than 300 bar.

26. The method according to claim 3, wherein the pressure drop is in the interval of 50-600 bar.

27. The method according to claim 5, wherein the predetermined distance is 15-500 μm.

28. The method according to claim 7, wherein the predetermined frequency is chosen such that a distance between two droplets consecutively ejected at the outflow opening is greater than or equal to three times the droplet diameter.

29. The method according to claim 13, wherein the transverse dimension of the outflow opening is smaller than or equal to 100 μm.

30. The method according to claim 13, wherein the transverse dimension of the outflow opening is smaller than or equal to 80 μm.

31. The method according to claim 4, wherein the feed pressure is in the interval of 50-600 bars.

32. The powder according to claim 18, having a monodispersity index smaller than 0.7.

33. The powder according to claim 18, having a monodispersity index smaller than 0.1.

34. The powder according to claim 18 having a bulk density larger than or equal to 650 kg/m$^3$.

* * * * *

UNITED STATES PATENT AND TRADEMARK OFFICE
CERTIFICATE OF CORRECTION

PATENT NO.       : 8,689,459 B2                                                Page 1 of 1
APPLICATION NO.  : 12/518139
DATED            : April 8, 2014
INVENTOR(S)      : Poortinga et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1211 days.

Signed and Sealed this

Twenty-ninth Day of September, 2015

Michelle K. Lee
*Director of the United States Patent and Trademark Office*